UNITED STATES PATENT OFFICE.

HARRY A. BIGGAR, OF LONG BEACH, CALIFORNIA.

ENAMELING COMPOSITION.

1,205,845.　　　　Specification of Letters Patent.　　Patented Nov. 21, 1916.

No Drawing.　　Application filed November 22, 1915.　Serial No. 62,888.

*To all whom it may concern:*

Be it known that I, HARRY A. BIGGAR, a citizen of the United States of America, residing at Long Beach, county of Los Angeles, State of California, have invented a certain new and useful Enameling Composition; and I do hereby declare the following to be a full, clear, and exact description of the invention, such as will enable others skilled in the art to which it appertains to make and use the same.

This invention relates to a new and improved composition of matter which though it is useful for other purposes is more particularly adapted for use to enamel metal.

The composition preferably consists of the following ingredients: soft asphalt, hard asphalt, rosin, bitumen, Portland cement, lime, petroleum spirits, and benzol.

The proportions of the ingredients are approximately as follows:—

| | | |
|---|---|---|
| Soft asphalt | Three | pounds. |
| Hard asphalt | Five | " |
| Rosin | Two | " |
| Bitumen | Three | " |
| Portland cement | One | " |
| Lime | One | " |
| Petroleum spirits | One-fourth | " |
| Benzol | One to three | " |

The soft asphalt, hard asphalt, rosin, and bitumen are first heated in order to melt and mix them together, whereupon the Portland cement and lime mixed with the petroleum spirits are added to and admixed with the heated mixture. While the mixture of ingredients just mentioned is still warm the desired amount of benzol is added to the mixture.

The improved composition of matter when applied to provide an enamel on the surface of metal is adapted to withstand a comparatively high degree of heat, and it is acid proof as well as water proof so that it thoroughly protects the metal against rust or corrosive action. The enamel is comparatively hard and durable, and it is flexible and adheres strongly to the metal. The flexibility and adhesiveness of the enamel prevents the latter from being cracked or detached when the metal is bent or subjected to blows or vibration by hammering, etc.

The soft asphalt makes the enamel lasting and non-brittle, the hard asphalt and the bitumen give the enamel its hardening and drying qualities, the rosin causes the enamel to adhere very strongly to the surfaces to which the enamel is applied, the cement and lime give the enamel its heat resisting quality, and the benzol thoroughly incorporates the other ingredients to effect an intimate admixture which does not require stirring when it is applied to form an enamel on metal or other surfaces. The petroleum spirits is used merely to prevent any boiling over when the Portland cement and lime are added to the heated mixture. About three pounds of the benzol is added when the composition is to be used to provide a first or priming coat on a surface, and about one pound of the benzol is added when the composition is to be used to provide a thick or final coat on the surface. Besides the advantages of being hard, durable, strongly adhesive, flexible, and resisting heat, water, and acid, the composition does not require any heating before it can be applied to work.

The composition which has been particularly described admits of substitution of ingredients and variations in proportions, wherefore the right is reserved to any substitution or variation whereby a composition is formed substantially equivalent to that set forth in the appended claims.

I claim:

1. The herein described composition of matter containing soft asphalt, hard asphalt, rosin, bitumen, Portland cement, lime, petroleum spirits, and benzol, substantially in the proportions specified.

2. A new composition of matter containing ingredients combined in proportions approximately as follows: soft asphalt, three pounds; hard asphalt, five pounds; rosin, two pounds; bitumen, three pounds; Portland cement, one pound; lime, one pound; petroleum spirits, one-fourth pound; benzol, one to three pounds; substantially as and for the purpose specified.

In testimony whereof, I have signed my name to this specification at Long Beach, county of Los Angeles, State of California, this 16th day of November A. D., 1915.

HARRY A. BIGGAR.